US012596849B2

(12) United States Patent
Jain et al.

(10) Patent No.: US 12,596,849 B2
(45) Date of Patent: Apr. 7, 2026

(54) MANAGING TRUSTED PLATFORM MODULE (TPM) REPLACEMENT AT AN INFORMATION HANDLING SYSTEM

(71) Applicant: Dell Products L.P., Round Rock, TX (US)

(72) Inventors: Shailesh Hastimal Jain, Mahrashtra (IN); Gokul Thiruchengode Vajravel, Bangalore (IN); Ramanaa H V, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 104 days.

(21) Appl. No.: 18/664,426

(22) Filed: May 15, 2024

(65) Prior Publication Data

US 2025/0356062 A1    Nov. 20, 2025

(51) Int. Cl.
*G06F 21/78*        (2013.01)
*G06F 21/60*        (2013.01)

(52) U.S. Cl.
CPC ............ *G06F 21/78* (2013.01); *G06F 21/602* (2013.01); *G06F 2221/2107* (2013.01)

(58) Field of Classification Search
CPC . G06F 21/78; G06F 21/602; G06F 2221/2107
See application file for complete search history.

(56) References Cited

U.S. PATENT DOCUMENTS

| | | | | |
|---|---|---|---|---|
| 2005/0166024 A1* | 7/2005 | Angelo | ................. | G06F 21/575 |
| | | | | 711/164 |
| 2012/0173885 A1* | 7/2012 | Acar | .................... | G06F 21/602 |
| | | | | 713/193 |
| 2013/0103934 A1* | 4/2013 | Hashioka | ............. | G06F 9/4401 |
| | | | | 713/1 |
| 2017/0302459 A1* | 10/2017 | Fenner | ................... | H04L 9/321 |
| 2023/0066427 A1* | 3/2023 | Aigner | ................... | G06F 21/53 |
| 2024/0086336 A1* | 3/2024 | Kim | ................... | G06F 12/1408 |

OTHER PUBLICATIONS

Re-activating the Trusted Platform Module (TPM) Security Feature After a System Board Replacement (https://www.dell.com/support/kbdoc/en-us/000155200/re-activating-the-trusted-platform-module-tpm-security-feature-after-a-system-board-replacement, viewed Aug. 12, 2024); 4 pages.

* cited by examiner

*Primary Examiner* — Sangseok Park
(74) *Attorney, Agent, or Firm* — McDermott Will & Schulte LLP

(57)            ABSTRACT

Managing TPM replacement at a IHS, including encrypting, by the client IHS, a storage device at the client IHS utilizing a first TPM and first keys; providing, by the client IHS and to the management server IHS, the first keys; storing the first keys at a database; detecting replacement of the first TPM with a second TPM at the client IHS, and in response: requesting, by the client IHS, the first keys; receiving, from the management server IHS, the first keys; decrypting, by the client IHS, the storage device at the client IHS utilizing the second TPM and the first keys; encrypting, by the client IHS, the storage device at the client IHS utilizing the second TPM and second keys differing from the first keys; providing, to the management server IHS, the second keys; and storing the second keys at the database.

12 Claims, 6 Drawing Sheets

200

Storage
Device
214

Client
Computing
Module 210

First TPM 212

Client Information
Handling System
202

Server
Computing
Module 220

Management
Server Information
Handling System
204

Database
206

200

Storage Device 214

Client Computing Module 210

Second TPM 292

Client Information Handling System 202

Server Computing Module 220

Management Server Information Handling System 204

Database 206

MANAGING TRUSTED PLATFORM MODULE (TPM) REPLACEMENT AT AN INFORMATION HANDLING SYSTEM

BACKGROUND

Field of the Disclosure

The disclosure relates generally to managing trusted platform module (TPM) replacement at an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A trusted platform module (TPM) is a chip embedded on a motherboard of the information handling system. The TPM plays a role in securing the information handling system during boot-up by providing a unique cryptographic key. This key unlocks full-disk encryption, ensuring that the information handling system starts up securely.

SUMMARY

Innovative aspects of the subject matter described in this specification may be embodied in a method of managing trusted platform module (TPM) replacement at a client information handling system (IHS), including registering the client IHS to a management server information handling system (IHS); encrypting, by the client IHS at a first time, a storage device at the client IHS utilizing a first TPM and first keys; providing, by the client IHS and to the management server IHS, the first keys; storing, by the management server IHS, the first keys at a database; detecting, at a second time after the first time, replacement of the first TPM with a second TPM at the client IHS, and in response: requesting, by the client IHS and to the management server IHS, the first keys; receiving, from the management server IHS and by the client IHS, the first keys; decrypting, by the client IHS, the storage device at the client IHS utilizing the second TPM and the first keys; encrypting, by the client IHS, the storage device at the client IHS utilizing the second TPM and second keys differing from the first keys; providing, by the client IHS and to the management server IHS, the second keys; and storing, by the management server IHS, the second keys at the database.

Other embodiments of these aspects include corresponding systems, apparatus, and computer programs, configured to perform the actions of the methods, encoded on computer storage devices.

These and other embodiments may each optionally include one or more of the following features. For instance, storing, at the first TPM, additional keys and certifications; providing, by the client IHS and to the management server IHS, the additional keys and the certifications; and storing, by the management server IHS, the additional keys and the certifications at the database. Identifying, by the client IHS, an adjustment of the additional keys; and periodically syncing the additional keys and the certifications with the management server IHS, including the adjustment of the additional keys. Requesting the first keys further includes requesting the additional keys and the certifications, the method further including receiving, from the management server IHS and by the client IHS, the additional keys and the certifications. Detecting replacement of the first TPM with the second TPM further includes detecting a failure to boot of the storage device. The first keys and the second keys are stored at the database in an encrypted format.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
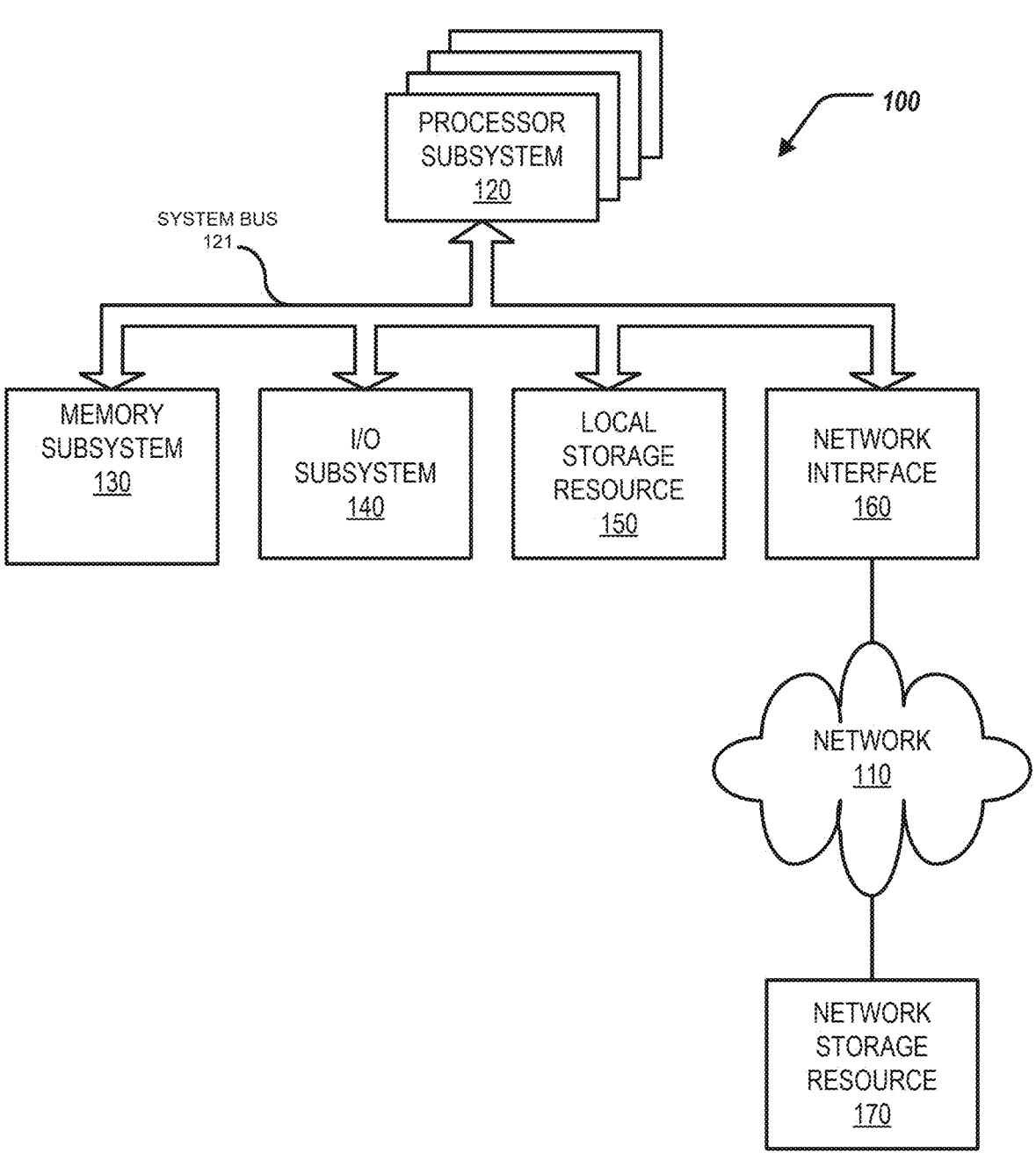
FIG. 1 is a block diagram of selected elements of an embodiment of an information handling system.

This disclosure discusses methods and systems for managing trusted platform module (TPM) replacement at an information handling system. In short, the TPM can fail (have a fault) and need to be physically replaced. A zero-touch manageability experience for replacement of the TPM can be provided. Specifically, restore/reuse of TPM keys can be facilitated to ensure zero to minimal loss of data at a storage device, described further herein.

Specifically, this disclosure discusses a system and a method for managing trusted platform module (TPM) replacement at a client information handling system (IHS), including registering the client IHS to a management server information handling system (IHS); encrypting, by the client IHS at a first time, a storage device at the client IHS utilizing a first TPM and first keys; providing, by the client IHS and to the management server IHS, the first keys; storing, by the management server IHS, the first keys at a database; detecting, at a second time after the first time, replacement of the first TPM with a second TPM at the client IHS, and in response: requesting, by the client IHS and to the management server IHS, the first keys; receiving, from the management server IHS and by the client IHS, the first keys; decrypting, by the client IHS, the storage device at the client IHS utilizing the second TPM and the first keys; encrypting, by the client IHS, the storage device at the client IHS utilizing the second TPM and second keys differing from the first keys; providing, by the client IHS and to the management server IHS, the second keys; and storing, by the management server IHS, the second keys at the database.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2A:
FIGS. 2A, 2B illustrate respective block diagrams of a computing environment for managing TPM replacement at an information handling system.

Turning to FIG. 2A, FIG. 2A illustrates an environment 200 including a client information handling system (IHS) 202, a management server information handling system (IHS) 204, and a database 206.

The client IHS 202 can include a client computing module 210, a first trusted platform module (TPM) 212, and a storage device 214. In some examples, the client IHS 202 is similar to, or includes, the information handling system 100 of FIG. 1.

The management server IHS 204 can include a management server computing module 220. In some examples, the management server IHS 204 is similar to, or includes, the information handling system 100 of FIG. 1.

The client IHS 202 can be in communication with the management server IHS 204 (e.g., over a network).

The management server IHS 204 can be in communication with the client IHS 202 (e.g., over a network); and the database 206.

The database 206 can be in communication with the management server IHS 204.

In short, the first TPM 212 can fail (have a fault) and need to be physically replaced. The environment 200 can provide for a zero-touch manageability experience for replacement of the first TPM 212 via the management server IHS 204. Specifically, the management server IHS 204 can facilitate restore/reuse of TPM keys to ensure zero to minimal loss of data at the storage device 214, described further herein.

Figure 2B:
Figure 3:
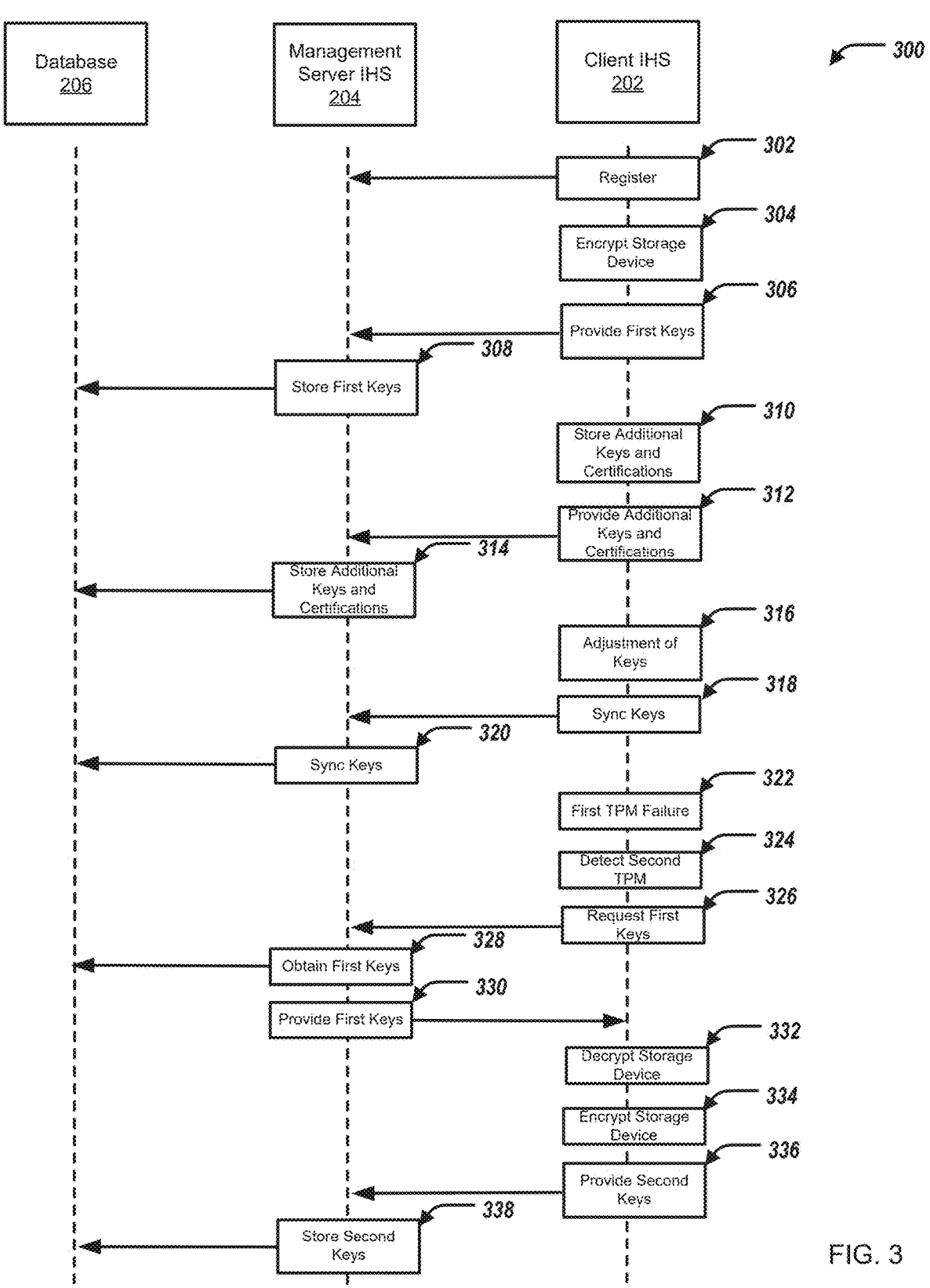
FIG. 3 illustrates a swim-lane diagram for managing TPM replacement at an information handling system.

FIG. 3 illustrates a swim-lane diagram of a method 300 for managing TPM replacement at an information handling system. The method 300 may be performed by the information handling system 100, the client information handling system 202, and/or the management server information handling system 204, and with reference to FIGS. 1-2. It is noted that certain operations described in method 300 may be optional or may be rearranged in different embodiments.

The client IHS 202 registers with the management server IHS 204, at 302. Specifically, the client computing module 210 registers the client IHS 202 with the management server IHS 204. The client IHS 202 registers with the management server IHS including providing identifying information of the client IHS 202, such as identifiers of the client IHS 202, identifiers of computing components of the client IHS 202, and/or identifiers of the first TPM 212.

The client IHS 202 encrypts, at a first time, the storage device 214, at 304. Specifically, the first TPM 212 encrypts the storage device 214 utilizing the first keys. The first TPM 212 is a secure element on to which security mechanisms— e.g., disk encryption by BitLocker—can store encryption keys. That is, the first TPM 212 can store the first keys.

The client IHS 202 can provide the first keys to the management server IHS 204, at 306. Specifically, the client computing module 210 can provide the first keys to the management server IHS 204. In some examples, the first keys can include two keys-a "regular" key that is used for decryption and a recovery key. In some examples, when the client IHS 202 provides the first keys to the management sever IHS 204, the client IHS 202 is providing only the recovery key to the management server IHS 204.

The management server IHS 204 stores the first keys at the database 206, at 308. Specifically, the database 206 can include an encrypted database such that the first keys are stored at the database 206 in an encrypted format. That is, the database 206 provides secure storage of the first keys (stored in an encrypted format as per organizational standards). For example, the database 206 can be an Apex Managed Device Service (AMDS) database. For example, the database 206 can store (or cache) the recovery key of the first TPM 212 used for encryption/decryption of the storage device 214.

The client IHS 202 can store, at the first TPM 212, additional keys and certifications of the client IHS 202, at 310. The client IHS 202 can provide the additional keys and certifications to the management server IHS 204 for storage at the database 206, at 312. The management data server IHS 204 can store, at the database 206, the additional keys and the certifications, at 314. That is, the database 206 can further store (as backup) other keys and certifications that use the first TPM 212 as secure storage (such as user specific keys and certifications).

The client IHS 202 can identify an adjustment of the keys, at 316. Specifically, the client computing module 210 can identify the adjustment of the first keys and/or the additional keys, such as addition, deletion, and/or modification of the keys. The client IHS 202 can periodically synchronize (sync) the first keys and/or the additional keys and the certifications with the management server IHS 204, at 318. The management server IHS 204 can synchronize the first keys, the additional keys and the certifications with the database 206, at 320. Specifically, the client computing module 210 can sync the first keys, additional keys and the certifications with the management server IHS 204, including the adjustments to the additional keys. Thus, the first keys associated with the first TPM 212, the additional keys, and the certifications are synchronized with the database 206 such that the backup versions of such are up-to-date at the database 206.

The first TPM 212 experiences a failure, at 322. The first TPM 212 is physically replaced by a second TPM 292, as shown in FIG. 2B.

The client IHS 202 detects, at a second time after the first time, the replacement of the first TPM 212 with the second TPM 292 at the client IHS 202, at 324. Specifically, the client computing module 210 can detect the replacement of the first TPM 212 with the second TPM 292 by detecting a failure to boot of the storage device 214. In some examples, the client computing module 210 can detect, upon replacement of the first TPM 212 with the second TPM 292, a failure to boot of the storage device 214 as the storage device 214 is encrypted.

The client IHS 202 can request the first keys from the management server IHS 204, at 326. Specifically, the client computing module 210 can request the first keys from the management server IHS 204. In some examples, the client computing module 210 can implement BIOS connect or PODS for recovery of the first keys. In some examples, the client IHS 202 can further request the additional keys and the certifications from the management server IHS 204.

The management server IHS 204 can request the first keys from the database 206, at 328. Specifically, the server computing module 220 can request the first keys from the database 206. In some examples, the management server IHS 204 can further request the additional keys and the certifications from the database 206.

The client IHS 202 can receive, from the management server IHS 204, the first keys, at 330. For example, the client computing module 210 can receive the recovery keys associated with the first TPM 212. The management server IHS 204 can provide the first keys to the client IHS 202. In some examples, the client IHS 202 can further receive (from the management server IHS 204) the additional keys and the certifications stored at the database 206.

The client IHS 202 can decrypt the storage device 214, at 332. Specifically, the second TPM 292 can decrypt the storage device 214 utilizing the first keys. That is, once the recovery keys are recovered from the database 206, the second TPM 292 can decrypt the storage device 214 utilizing the first keys such that the storage device 214 can be booted. Furthermore, the remaining additional keys and certifications can be restored at the second TPM 292 such that all applications executed at the client IHS 202 can continue to operate as normal.

The client IHS 202 can encrypt the storage device 214 utilizing the second TPM 292, at 334. Specifically, the second TPM 292 can encrypt the second TPM 292 utilizing second keys differing from the first keys. That is, the second TPM 292 can generate second keys used in encrypting the storage device 214. The second keys are new keys, and can include a recovery key. Thus, the same recovery key is not utilized more than once, and the recovery key restored from the database 206 is not further used to decrypt the storage device 214 (to prevent unauthorized access if the first keys were compromised). The second TPM 292 can store the second keys.

The client IHS 202 provides the second keys to the management server 204, at 336. Specifically, the client computing module 210 can provide the second keys to the management server IHS 204. In some examples, the second keys can include two keys-a "regular" key that is used for decryption and a recovery key. In some examples, when the client IHS 202 provides the second keys to the management sever IHS 204, the client IHS 202 is providing only the recovery key to the management server IHS 204.

The management server IHS 204 stores the first keys at the database 206, at 338. Specifically, the database 206 can include an encrypted database such that the second keys are stored at the database 206 in an encrypted format. That is, the database 206 can provide secure storage of the second keys (stored in an encrypted format as per organizational standards). For example, the database 206 can be an Apex Managed Device Service (AMDS) database. For example, the database 206 can store (or cache) the recovery key of the second TPM 292 used for encryption/decryption of the storage device 214.

Figure 4:
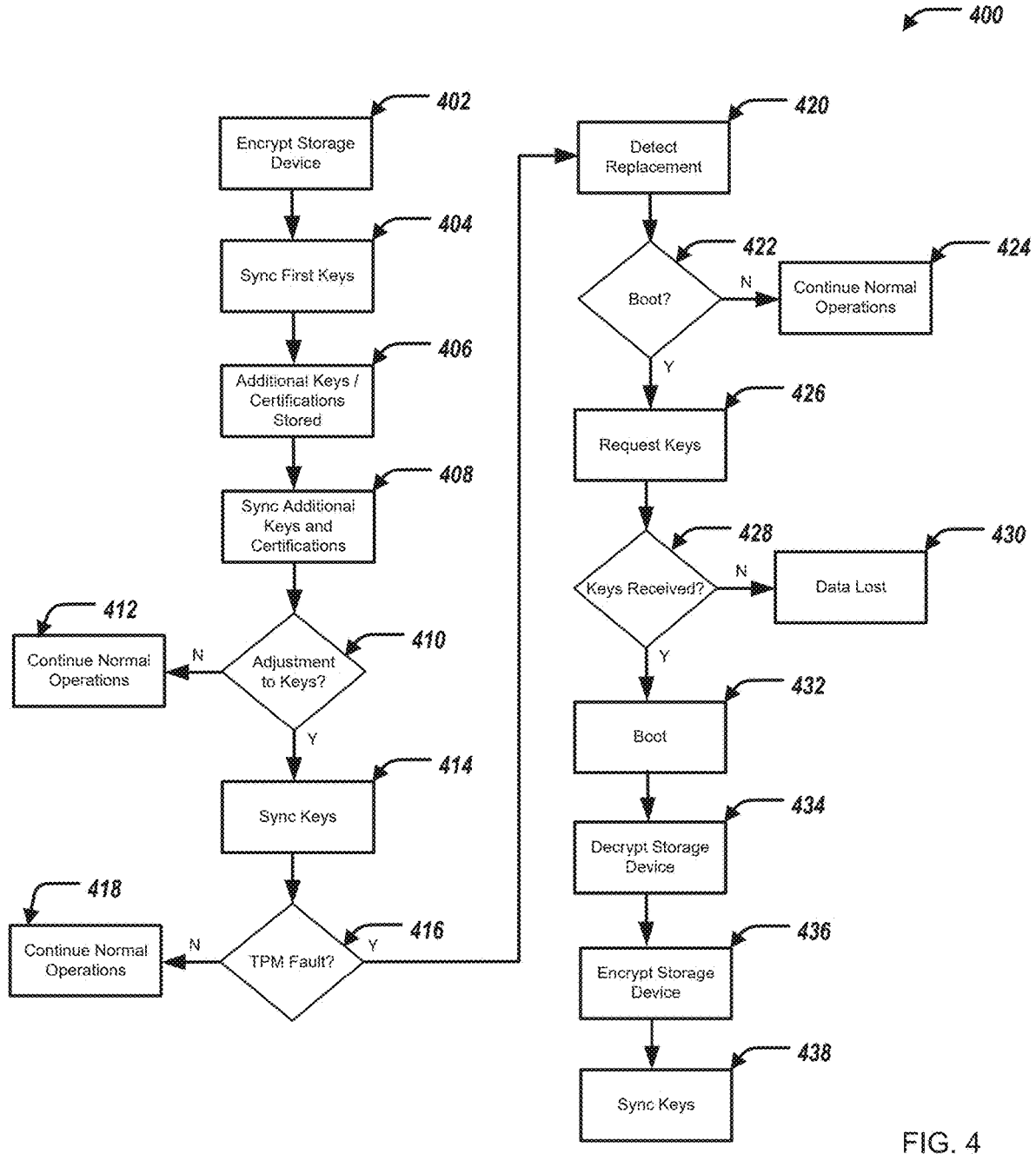
FIGS. 4, 5 illustrate respective methods for managing TPM replacement at an information handling system.

FIG. 4 illustrates a method 400 for managing TPM replacement at an information handling system. The method 400 may be performed by the information handling system 100, the client information handling system 202, and/or the management server information handling system 204, and with reference to FIGS. 1-2. It is noted that certain operations described in method 400 may be optional or may be rearranged in different embodiments.

The first TPM 212 encrypts, at a first time, the storage device 214, at 402. The client IHS 202 syncs the first keys to the management server IHS 204, at 404. Further, the management server IHS 204 stores the first keys at the database 206. The first TPM 212 can store additional keys and certifications of the client IHS 202, at 406. The client IHS 202 can provide the additional keys and certifications to the management server IHS 204 for storage at the database 206, at 408. The client IHS 202 can determine if there is an adjustment to any of the keys, at 410. When the client IHS 202 determines there are no adjustments to the keys, the client IHS 202 continues normal operations, at 412. When the client IHS 202 determines that there are adjustments to the keys, the client IHS 202 can synchronize (sync) the keys and the certifications with the management server IHS 204, at 414. The client IHS 202 can determine whether the first TPM 212 experiences a failure/fault, at 416. When the client IHS 202 determines that the first TPM 212 did not experience a failure/fault, the client IHS 202 continues normal operations, at 418. When the client IHS 202 determines that the first TPM 212 did experience a failure/fault, the client IHS 202 detects the replacement of the first TPM 212 with the second TPM 292, at 420. The client IHS 202 determines whether the storage device 214 is able to boot, at 422. When the client IHS 202 determines that the storage device 214 is able to boot, the client IHS 202 continues normal operations, at 424. When the client IHS 202 determines that the storage device 214 is unable to boot, the client IHS 202 requests the first keys from the management server IHS 204, at 426. The client IHS 202 determines whether the first keys have been received from the management server IHS 204, at 428. When the client IHS 202 determines that the first keys have not been received, the data at the storage device 214 is deemed as lost. When the client IHS 202 determines that the first keys have been received, the storage device 214 is booted, at 432. The second TPM 292 can decrypt the storage device 214 utilizing the first keys, at 434. The second TPM 292 can encrypt the storage device 214 utilizing the second keys, at 436. The client IHS 202 provides the second keys to the management server IHS 204, at 438. The management server IHS 204 stores the first keys at the database 206.

Figure 5:
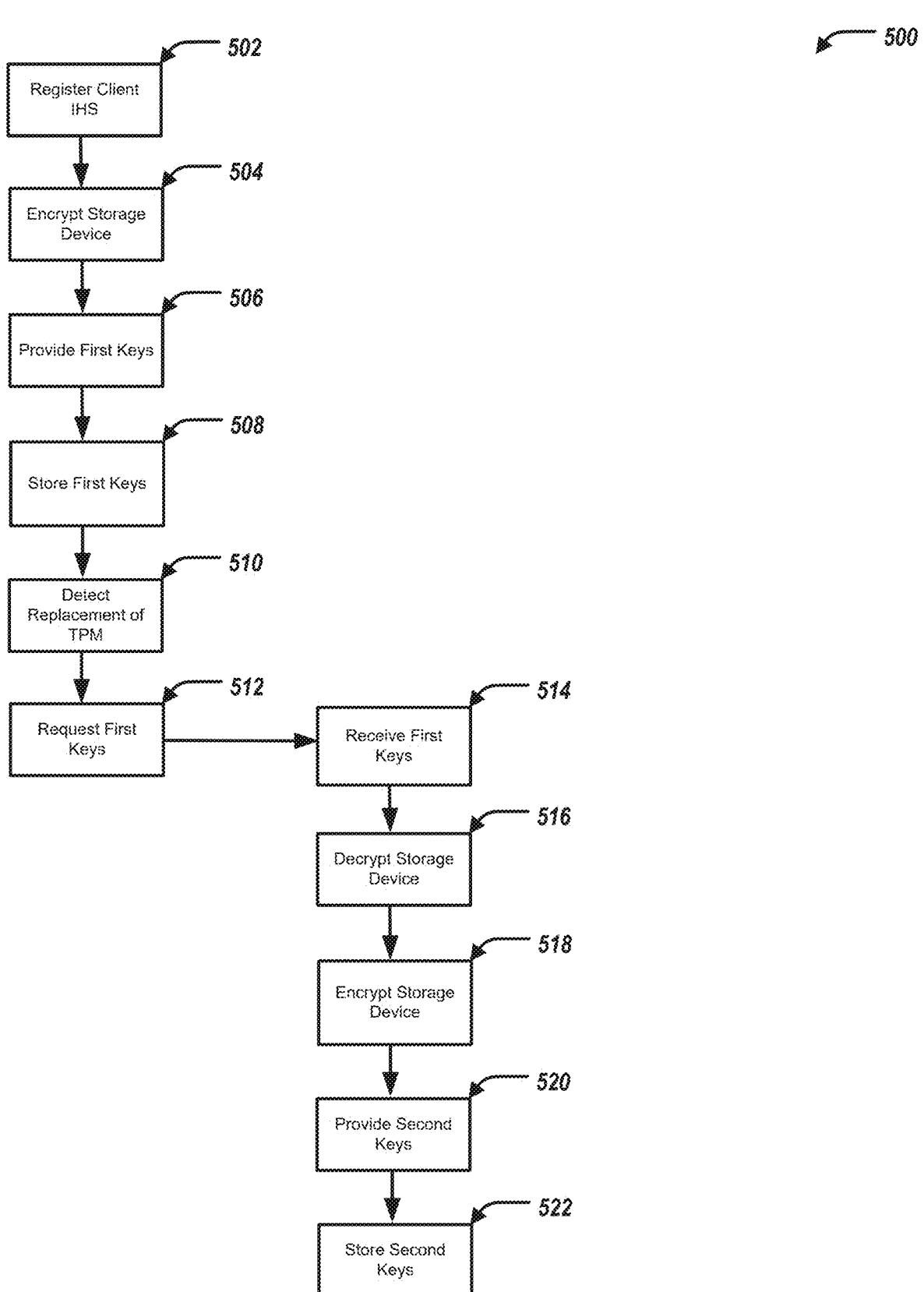

FIG. 5 illustrates a method 500 for managing TPM replacement at an information handling system. The method 500 may be performed by the information handling system 100, the client information handling system 202, and/or the management server information handling system 204, and with reference to FIGS. 1-2. It is noted that certain operations described in method 500 may be optional or may be rearranged in different embodiments.

The client IHS 202 registers with the management server IHS 204, at 502. The client IHS 202 encrypts, at a first time, the storage device 214, at 504. The client IHS 202 can provide the first keys to the management server IHS 204, at 506. The management server IHS 204 stores the first keys at the database 206, at 508. The client IHS 202 detects, at a second time after the first time, the replacement of the first TPM 212 with the second TPM 292 at the client IHS 202, at 510. The client IHS 202 can request the first keys from the management server IHS 204, at 512. The client IHS 202 can receive, from the management server IHS 204, the first keys, at 514. The client IHS 202 can decrypt the storage device 214, at 516. The client IHS 202 can encrypt the storage device 214 utilizing the second TPM 292, at 518. The client IHS 202 provides the second keys to the management server 204, at 520. The management server IHS 204 stores the first keys at the database 206, at 522.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of managing trusted platform module (TPM) replacement at a client information handling system (IHS), including:

registering the client IHS to a management server information handling system (IHS);

encrypting, by the client IHS at a first time, a storage device at the client IHS utilizing a first TPM and first keys;

storing, at the first TPM, additional keys and certifications;

providing, by the client IHS and to the management server IHS, the additional keys and the certifications;

storing, by the management server IHS, the additional keys and the certifications at the database identifying, by the client IHS, an adjustment of the additional keys;

periodically syncing the additional keys and the certifications with the management server IHS, including the adjustment of the additional keys;

providing, by the client IHS and to the management server IHS, the first keys;

storing, by the management server IHS, the first keys at a database;

detecting, at a second time after the first time, replacement of the first TPM with a second TPM at the client IHS, and in response:

requesting, by the client IHS and to the management server IHS, the first keys;

receiving, from the management server IHS and by the client IHS, the first keys;

decrypting, by the client IHS, the storage device at the client IHS utilizing the second TPM and the first keys;

encrypting, by the client IHS, the storage device at the client IHS utilizing the second TPM and second keys differing from the first keys;

providing, by the client IHS and to the management server IHS, the second keys; and storing, by the management server IHS, the second keys at the database.

2. The computer-implemented method of claim 1, wherein requesting the first keys further includes requesting the additional keys and the certifications, the method further including receiving, from the management server IHS and by the client IHS, the additional keys and the certifications.

3. The computer-implemented method of claim 1, wherein detecting replacement of the first TPM with the second TPM further includes detecting a failure to boot of the storage device.

4. The computer-implemented method of claim 1, wherein the first keys and the second keys are stored at the database in an encrypted format.

5. A computing environment, including:

a server management information handling system comprising a processor having access to memory media storing instructions executable by the processor to perform operations;

a client information handling system comprising a processor having access to memory media storing instructions executable by the processor to perform operations, comprising:

registering the client IHS to a management server information handling system (IHS);

encrypting, at a first time, a storage device at the client IHS utilizing a first TPM and first keys;

providing, to the management server IHS, the first keys;

wherein the management server IHS is configured to perform operations:

storing the first keys at a database;

wherein the client IHS is configured to perform operations:

detecting, at a second time after the first time, replacement of the first TPM with a second TPM at the client IHS, and in response:

requesting, to the management server IHS, the first keys;

receiving, from the management server IHS, the first keys;

decrypting the storage device at the client IHS utilizing the second TPM and the first keys;

encrypting the storage device at the client IHS utilizing the second TPM and second keys differing from the first keys;

providing, to the management server IHS, the second keys; and wherein the management server IHS is configured to perform operations:

storing the second keys at the database;

wherein the client IHS is configured to perform operations:

storing, at the first TPM, additional keys and certifications;

providing, to the management server IHS, the additional keys and the certifications; and wherein the management server IHS is configured to perform operations:

storing the additional keys and the certifications at the database wherein the client IHS is configured to perform operations:

identifying an adjustment of the additional keys; and periodically syncing the additional keys and the certifications with the management server IHS, including the adjustment of the additional keys.

6. The computing environment of claim 5, wherein requesting the first keys further includes requesting the additional keys and the certifications, the method further including receiving, from the management server IHS and by the client IHS, the additional keys and the certifications.

7. The computing environment of claim 5, wherein detecting replacement of the first TPM with the second TPM further includes detecting a failure to boot of the storage device.

8. The computing environment of claim 5, wherein the first keys and the second keys are stored at the database in an encrypted format.

9. A non-transitory computer-readable medium storing software comprising instructions executable by one or more computers which, upon such execution, cause the one or more computers to perform operations comprising:

registering the client IHS to a management server information handling system (IHS);

encrypting, by the client IHS at a first time, a storage device at the client IHS utilizing a first TPM and first keys;

storing, at the first TPM, additional keys and certifications;

providing, by the client IHS and to the management server IHS, the additional keys and the certifications;

storing, by the management server IHS, the additional keys and the certifications at the database identifying, by the client IHS, an adjustment of the additional keys;

periodically syncing the additional keys and the certifications with the management server IHS, including the adjustment of the additional keys;

providing, by the client IHS and to the management server IHS, the first keys;

storing, by the management server IHS, the first keys at a database;

detecting, at a second time after the first time, replacement of the first TPM with a second TPM at the client IHS, and in response:

requesting, by the client IHS and to the management server IHS, the first keys;

receiving, from the management server IHS and by the client IHS, the first keys;

decrypting, by the client IHS, the storage device at the client IHS utilizing the second TPM and the first keys;

encrypting, by the client IHS, the storage device at the client IHS utilizing the second TPM and second keys differing from the first keys;

providing, by the client IHS and to the management server IHS, the second keys; and storing, by the management server IHS, the second keys at the database.

10. The non-transitory computer-readable medium of claim 9, wherein requesting the first keys further includes requesting the additional keys and the certifications, the method further including receiving, from the management server IHS and by the client IHS, the additional keys and the certifications.

11. The non-transitory computer-readable medium of claim 9, wherein detecting replacement of the first TPM with the second TPM further includes detecting a failure to boot of the storage device.

12. The non-transitory computer-readable medium of claim 9, wherein the first keys and the second keys are stored at the database in an encrypted format.

* * * * *